United States Patent
Wu (10) Patent No.: US 8,132,242 B1
(45) Date of Patent: Mar. 6, 2012

(54) AUTOMATED AUTHENTICATION OF SOFTWARE APPLICATIONS USING A LIMITED-USE TOKEN

(75) Inventor: Yuhua Wu, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1381 days.

(21) Appl. No.: 11/352,621

(22) Filed: Feb. 13, 2006

(51) Int. Cl.
*H04L 9/06* (2006.01)

(52) U.S. Cl. .............................. 726/8; 713/168; 713/182

(58) Field of Classification Search .................. 713/155, 713/168, 182, 172; 726/8–10
See application file for complete search history.

(56) References Cited

U.S. PATENT DOCUMENTS

| | | | | |
|---|---|---|---|---|
| 6,253,327 B1 * | 6/2001 | Zhang et al. | ..................... | 726/14 |
| 6,453,353 B1 * | 9/2002 | Win et al. | ..................... | 709/229 |
| 6,609,198 B1 * | 8/2003 | Wood et al. | ................... | 713/155 |
| 6,804,687 B2 * | 10/2004 | Sampson | ...................... | 707/200 |
| 6,826,696 B1 * | 11/2004 | Chawla et al. | .................... | 726/4 |
| 7,500,262 B1 * | 3/2009 | Sanin et al. | ........................ | 726/2 |
| 2004/0250118 A1 * | 12/2004 | Andreev et al. | ............... | 713/201 |
| 2005/0278651 A1 * | 12/2005 | Coe et al. | ...................... | 715/779 |
| 2006/0294196 A1 * | 12/2006 | Feirouz et al. | ................ | 709/217 |

\* cited by examiner

*Primary Examiner* — Michael Pyzocha
*Assistant Examiner* — Phy Anh Vu
(74) *Attorney, Agent, or Firm* — Shumaker & Sieffert, P.A.

(57) ABSTRACT

In general, the invention is directed to techniques of automated authentication of network-enabled software applications launched by a web browser. For example, an intermediate device, such as a Virtual Private Network (VPN) gateway, intercepts communications between a client device and a server. The gateway device automatically issues a temporary token to the client device when the web browser requests a resource that will result in the launch of an additional software application external to the web browser. This temporary token is only valid for a limited time and a limited number of uses. Subsequently, the gateway device uses the temporary token to authenticate the second software application, thereby avoiding passing user credentials from the web browser to the second application on the client device via an insecure persistent cookie.

18 Claims, 7 Drawing Sheets

| ID ⌐132 | USER AGENT ⌐134 | EXPIRATION TIME ⌐136 | USAGE ⌐138 |
|---|---|---|---|
| 1 | MICROSOFT WORD | 2/2/2006 8:00:01 AM | 1 |
| 50 | ADOBE ACROBAT | 2/2/2006 8:07:30 AM | 1 |
| 46 | MICROSOFT SHAREPOINT | 2/2/2006 8:40:03 AM | 0 |
| 76 | SPREADSHEET | 2/2/2006 8:16:45 AM | 0 |
| 24 | WORDPERFECT | 2/3/2006 10:00:08 PM | 2 |
| ••• | ••• | ••• | ••• |
| N | AGENT N | TIME N | N |

FIG. 6

| URL PATTERN ⌐140 | HOSTNAME PATTERN ⌐142 | TIME VALID ⌐144 | MAX. USES ⌐146 |
|---|---|---|---|
| /docs/*.doc | www.ex.com | 5 minutes | 1 |
| /slides/*.ppt | www.ex1.com | 10 minutes | 2 |
| /specs/*/*.pdf | ww+.ex.com | .5 minutes | 1 |
| /*/income/*.xls | [h1, h2].ex.com | 60 minutes | 10 |
| ••• | ••• | ••• | ••• |
| Regular expression | Regular expression | N minutes | N uses |

AUTOMATED AUTHENTICATION OF SOFTWARE APPLICATIONS USING A LIMITED-USE TOKEN

TECHNICAL FIELD

The invention relates to computer networks and, in particular, to authenticating users with a computer network.

BACKGROUND

An enterprise may use a virtual private network (VPN) to protect one or more network resource. To access these VPN-protected resources through a web browser, a VPN gateway or other security device requires a remote user to supply credentials, e.g., a username and password. After the user supplies the credentials, the VPN gateway authenticates the user and establishes a secure session between the web browser and the VPN gateway.

Subsequently, the user may use the web browser to access the VPN-protected resources. In some instances, a resource may be associated with a network-enabled software application other than the web browser. In such an instance, the web browser may automatically launch the corresponding software application on the client device. As one example, if when using the web browser the user requests access to a document created in Word by Microsoft Corporation®, the web browser may automatically launch automatically launch Microsoft Word on the client device.

In many instances, the web browser launches the software application on the client device external to the secure session, i.e., external to the web browser. In this situation, the VPN gateway may demand that the user supply a username and password before allowing the network-enabled external application to access the VPN-protected resource. Thus, these solutions may require the user to reenter the username and password at least once for each external application launched from the web browser or other application.

In other prior art solutions the web browser creates a "persistent cookie" that may be shared across all software applications executing on the client device. In this approach the external applications access the "persistent cookie" to retrieve the username, password, and other credential information needed to establish a VPN connection between the external application and the VPN gateway. In this manner, the user is not forced to reenter his or her security credentials. However, these approaches present security issues because a malicious software application could access the credentials stored in the persistent cookie and establish a VPN connection surreptitiously.

SUMMARY

In general, the invention is directed to techniques of automated authentication of software applications launched by a web browser on a client device. More specifically, a request for a network resource is intercepted and a temporary token is issued to the client device. This temporary token contains credential information that is valid for a limited time and for a limited number of uses, such as a single use. Subsequently, the launched software application uses the temporary token for authenticating the user, at which time the temporary credentials are automatically replaced with the user's actual credentials. In this manner, the techniques avoid the use of an insecure persistent cookie for sharing user credentials between applications on the client device.

For example, a web browser may establish a secure sockets layer virtual private network (SSL VPN) session with a SSL VPN gateway by providing one or more authentication credentials to the SSL VPN gateway. When the user of the web browser sends a request to access one of the resources provided by a resource server protected by the SSL VPN gateway, the request is intercepted, either by specialized software executing on the client device or by the SSL VPN gateway. In either case, the SSL VPN gateway issues a temporary token to the client device when the requested resource is associated with a software application that is external to the web browser. This temporary token includes temporary credential information that can subsequently be used by the SSL VPN gateway to authenticate the external application. Moreover, the SSL VPN gateway may limit use of this temporary token to a single usage and for a limited time period. When the web browser subsequently launches the external application, the external application may then send the temporary token to the resource server. The SSL VPN gateway intercepts this second request and examines the temporary token. If the temporary token is valid, e.g., has not exceeded its limited usage and is being used within the limited valid time period, the SSL VPN gateway authenticates the external application and replaces the temporary credentials within the token with the user's actual credentials. In this way, if the web browser has been authenticated to the SSL VPN gateway, the external application may be automatically authenticated to the SSL VPN gateway as well without use of a conventional persistent cookie that exposes the user's credentials.

In one embodiment, a method comprises intercepting a request for a resource stored on a server, wherein the request originates from a first software application executing on the client device. The method further comprises issuing a temporary token from an intermediate device to the client device when the requested resource will result in the first application launching a second software application on the client device. The intermediate device is located between the client device and the server, and the temporary token is valid for a limited time and for a limited number of uses. In addition, the method comprises authenticating the second software application with the intermediate device using the temporary token after the second application is launched.

In another embodiment, a network device comprises a network interface to intercept a request for a resource, wherein the first request originates from a first software application executing on a client device. In addition, the network device a token creation module to create a temporary token when the resource is associated with a second software application other than the first software application, wherein the temporary token is valid for a limited time and a limited number of uses. The network device also includes a secure socket layer (SSL) virtual private network (VPN) manager to issue the temporary token to the client device and authenticate the second software application using the temporary token.

In another embodiment, the invention is directed to a system that comprises a client device on which a first software application executes, the first software application issuing a request for a resource. The system also comprises a resource server for providing the client device with access to the resource. In addition, the system comprise an intermediate device located between the client device and the resource server. The intermediate device intercepts the request and issues a temporary token to the client device when the requested resource is associated with a second software application other than the first software application. In addition, the intermediate device validates the second application using the temporary token for a limited time and a single use.

In another embodiment, the invention is directed to a computer-readable medium containing instructions. The instructions cause a programmable processor to intercept a request for a resource, wherein the request originates from a first software application executing on the client device. In addition, the instructions cause the processor to issue a temporary token to the client device when the requested resource is associated with a second software application other than the first software application, wherein the temporary token is valid for a limited time and a limited number of uses. The instructions also cause the processor to authenticate the second software application using the temporary token.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
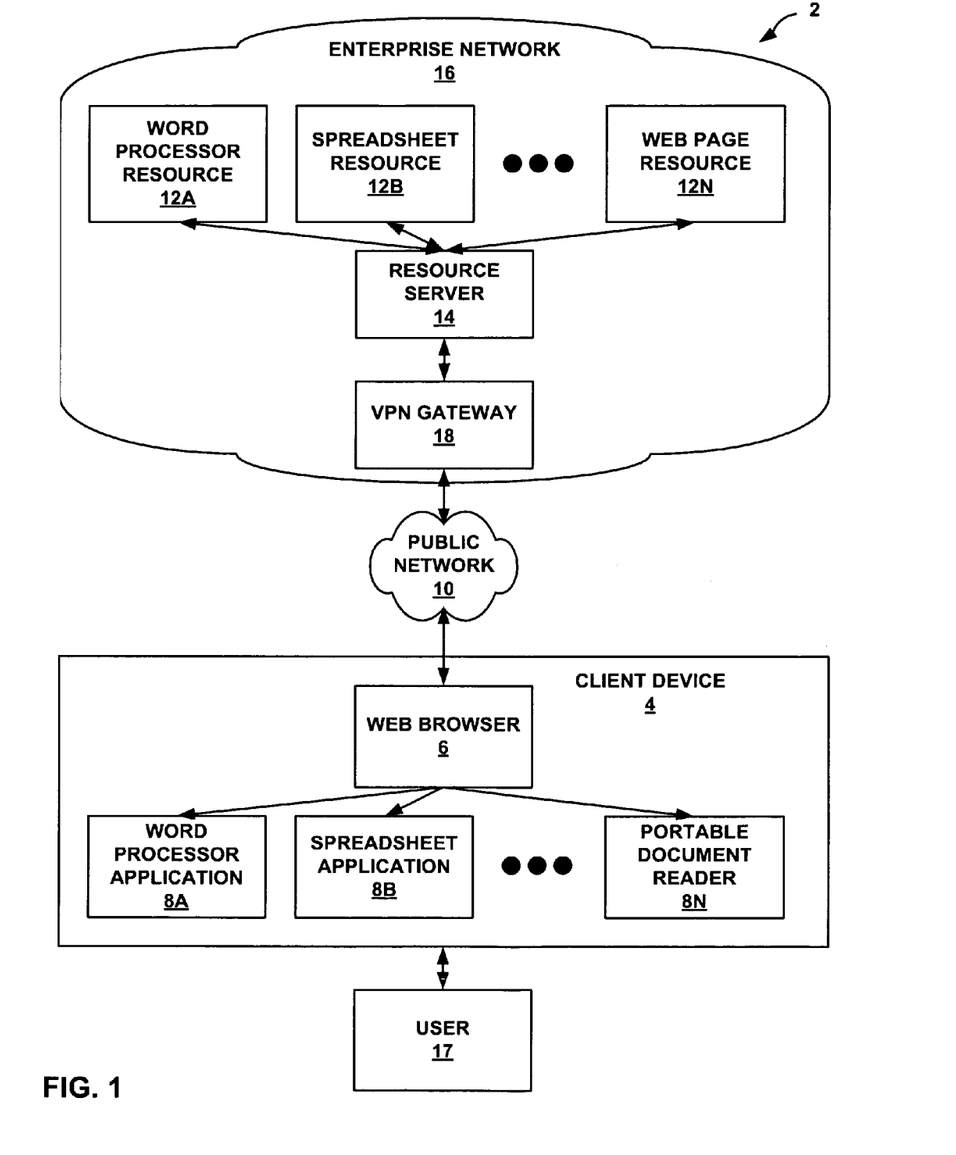
FIG. 1 is a block diagram illustrating an exemplary system in which a client device having a web browser and one or more external applications uses a Virtual Private Network (VPN) to access one or more remote resources.

FIG. 1 is a block diagram illustrating an exemplary system 2 in which a client device 4 includes a web browser 6 and one or more external applications 8A through 8N (collectively, external applications 8) that use a public network 10 to interact with one or more network resources 12A through 12N (collectively, resources 12). In exemplary system 2, public network 10 may be a wide-area network such as the Internet, a local-area network, or another type of computer network. A resource server 14 located within an enterprise network 16 provides resources 12. For instance, resource server 14 may be a SharePoint® Portal Server by Microsoft Corporation. Resources 12 may include word processing resources, spreadsheet resources, portable document resources, and so on.

To access resources 12, a user 17 establishes a secure session and authenticates web browser 6 to a virtual private network (VPN) gateway 18 in enterprise network 16. VPN gateway 18 may act as a security device to prevent network traffic from unauthenticated applications from accessing resource server 14. To authenticate web browser 6, user 17 may submit one or more security credentials of user 17 to VPN gateway 18. These authentication credentials may include a username and password, a one-time password, biometric information, or other information. If VPN gateway 18 successfully validates the authentication credentials, VPN gateway 18 authenticates web browser 6.

After VPN gateway 18 authenticates web browser 6, user 17 may use web browser 6 to request one of resources 12. For example, user 17 may generate a resource request by clicking on a link of a web page displayed in web browser 6. However, the resource request is intercepted before the resource request reaches resource server 14. As explained in detail below, in one exemplary embodiment specialized software executing on client device 4 intercepts the resource request. In another embodiment explained below, VPN gateway 18 in enterprise network 16 monitors the communications between client device 4 and server 14 and intercepts resource requests.

After the request is intercepted, VPN gateway 18 issues a temporary token to client device 4 when the requested resource is associated with a network-enabled software application (i.e., program) other than web browser 6. For instance, in this example resource 12A is a word processor document. Hence, remote resource 12A may be associated with a word processor application, such as Microsoft Word. Provided that web browser 6 is authenticated to VPN gateway 18, VPN gateway 18 issues a temporary token to client device 4 in response to the intercepted request.

A temporary token contains temporary credential information for use by VPN gateway 18 to subsequently authenticate an external application on client device 4 associated with the requested resource. Unlike a persistent cookie, VPN gateway 18 ensures that the temporary token is only valid for a limited time and for a limited number of uses. For instance, the temporary token may be valid for 30 seconds and for a single use. Moreover, the temporary token is not specific to a particular application. For example, in some implementations, a temporary token may take the form of a persistent cookie that is accessible by applications 8 outside the scope of the web browser 6 on client device 4. That is, any software application 8 executing on client device may access the temporary token, but the temporary security information contained within the token and the limited usage policed by VPN gateway 18 provide increased security.

After VPN gateway 18 issues the temporary token to client device 4, web browser 6 may launch an application 8 external to web browser 6 to handle the requested resource. Subsequently, the external application 8 may send a resource request to resource server 14 independent of web browser 6. When the external application 8 sends a resource request, the external application includes the temporary token in the resource request.

After the external application sends a resource request, software executing on client device 4 or VPN gateway 18 may intercept the resource request. In either case, VPN gateway 18 attempts to authenticate the external application using a temporary token in the resource request. For example, VPN gateway 18 authenticates the external application 8 when the resource request contains the temporary token and the temporary token is valid. If the temporary token is no longer valid given the expiration period and the number of remaining usages, VPN gateway 18 may block the resource request until user 17 submits valid authentication credentials for the external application. If the temporary token is still valid, VPN gateway 18 authenticates the external application and issues an application-specific cookie to the external application.

The application-specific cookie issued to the external application 8 includes the actual user credentials as previously authenticated by the VPN gateway 18. Subsequently, the external application 8 includes the session-specific cookie in each resource request. In this way, VPN gateway 18 automatically authenticates the external application without user 17 supplying authentication credentials for the external application 8.

The principles of this invention may present one or more advantages. For instance, this invention may reduce the frequency with which user 17 must reenter authentication credentials. Reducing the frequency with which user 17 reenters authentication credentials may increase productivity and reduce user annoyance. Further, this invention may increase the security of resources 12. Because the actual credentials of user 17 are always stored in application-specific cookies that cannot be shared between applications, it may be more difficult for a malicious program to access the credentials. In addition, because temporary tokens are limited in time and usage, it is more difficult for a malicious program to use a temporary token for malicious purposes.

Figure 2:
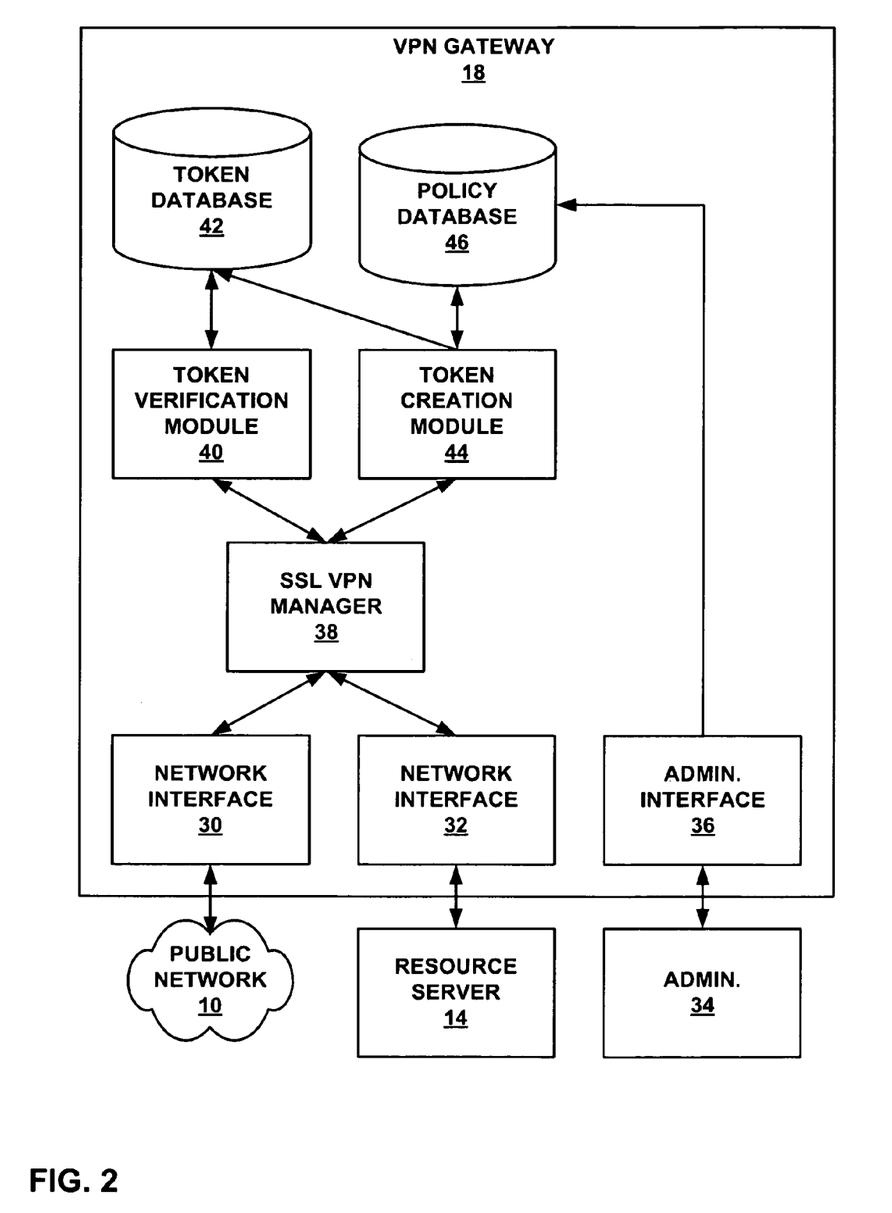
FIG. 2 is a block diagram illustrating an exemplary embodiment of a VPN gateway.

FIG. 2 is a block diagram illustrating an exemplary embodiment of VPN gateway 18 (FIG. 1). VPN gateway 18 communicates with network 10 through a first network interface 30 and communicates with resource server 14 through a second network interface 32. In addition, VPN gateway 18 may communicate with an administrator 34 through an administrative interface 36, which may be a separate network interface or a software module that communicates through one of the network interfaces 30, 32.

When VPN gateway 18 receives a request from an application executing on client device 4, network interface 30 forwards the request to a Secure Sockets Layer (SSL) VPN manager 38. Upon receiving the request, SSL VPN manager 38 determines whether an SSL VPN connection exists between client device 4 and VPN gateway 18. If such an SSL VPN connection does not exist, SSL VPN manager 38 sends a request to user 17 for one or more authentication credentials. If user 17 does not supply valid authentication credentials, SSL VPN manager 38 may request the authentication credentials again. When user 17 supplies valid authentication credentials, SSL VPN manager 38 establishes an SSL VPN connection between VPN gateway 18 and client device 4.

In one embodiment, after establishing the VPN connection, SSL VPN manager 38 intercepts requests from client device 4 and responses from server 14 and determines whether the resource request will result in the launch of an application on client device 14, i.e., that the requested resource associated with an application other than the application that sent the request. For example, SSL VPN manager 38 may compare the "user-agent" field of a HyperText Transfer Protocol (HTTP) request with a file name suffix of the requested resource. The "user-agent" field identifies a particular type of application that is sending the request. Likewise, a file name suffix may denote an association with a particular type of application. Therefore, if the user-agent field of a request identifies a type of application that is associated with a file name suffix of the requested resource, SSL VPN manager 38 may determine that the request is for a resource associated with an application other than the application that sent the request. As another example, SSL VPN manager 38 may use the "accept" field of the HTTP request header to determine which type of resource the requesting application will accept.

If SSL VPN manager 38 determines that the request will not result in the launch of another application on client device 4, SSL VPN manager 38 transparently forwards the resource request to resource server 14 via network interface 32. On the other hand, if SSL VPN manager 38 determines that the intercepted resource request will result in the launch of an application 8, SSL VPN manager 38 requests that token creation module 44 issue a temporary token.

In another embodiment, software executing on client device 4 intercepts user actions associated with the web browser and makes this determination. In that embodiment, the software, such as a Java script, opens a second communication channel and request a temporary token from token creation module 44 of SSL VPN manager 38.

In either case, upon receiving the request, token creation module 44 determines which type of temporary token to issue for the request. To accomplish this, token creation module 44 may compare the resource request with entries in a policy database 46. In one embodiment, each entry in policy database 46 contains a Universal Resource Locator (URL) pattern, a hostname pattern, a time valid, and a number that indicates a maximum number of uses of the temporary token. If the URL and the hostname of the request satisfy the URL pattern and the hostname pattern of an entry in policy database 46, token creation module 44 creates an entry in a token database 42. In one embodiment, the new entry in token database 42 contains a numerical identifier of the temporary token, a string that identifies which application sent the request, and the time valid and maximum uses fields from the policy database entry. After token creation module 44 creates the entry in token database 42, token creation module 44 creates a new temporary token that contains the numerical identifier of the temporary token. SSL VPN manager 38 then forwards the resource request to resource server 14. Subsequently, SSL VPN manager 38 issues the temporary token to client device 4 by intercepting the response to the resource request and injecting the temporary token into the response. SSL VPN manager 38 then forwards the response to client device 4.

Upon receiving a subsequent resource request that includes a temporary token, SSL VPN manager 38 forwards the resource request to a token verification module 40. Token verification module 40 attempts to use the temporary token to authenticate the application that sent the resource request. For example, upon receiving request, token verification module 40 extracts a token identifier from the temporary token. The token verification module 40 then uses the token identifier to retrieve token information from token database 42. For instance, token verification module 40 may retrieve information relating to the type of application associated with the temporary token, information relating to the expiration time of the temporary token, and information related to the remaining uses of the temporary token. For example, the token information may state that the temporary token is associated with a word processor application, expires on Feb. 1, 2006 at 6:16:35 PM, and that there is one remaining use.

After retrieving the token information from token database 42, token verification module 40 determines whether the temporary token is valid given the token information. For instance, if the token information indicates that there are no remaining usages for the token, token verification module 40 determines that the temporary token is invalid. If the temporary token is invalid, token verification module 40 alerts SSL VPN manager 38 that the temporary token is invalid. As a result, SSL VPN manager 38 may demand that user 17 supply the authentication credentials for the application that sent the resource request again. On the other hand, if the temporary token is valid, token verification module 40 updates token database 42 by decrementing the number of uses remaining for the temporary token. SSL VPN manager 38 forwards the request to resource server 14. Subsequently, SSL VPN manager 38 intercepts the response from resource server 14 to the resource request. When SSL VPN manager 38 intercepts the response, SSL VPN manager 38 issues an application-specific cookie having the actual credentials of user 17 and injects the cookie into the intercepted response. SSL VPN manager 38 then forwards the response having the session-specific cookie to client device 4. In this manner, VPN gateways facilities the use of temporary tokens (e.g., persistent cookies having temporary credentials and limited uses) and avoids the use of insecure persistent cookies.

Administrator 34 may edit policy database 46 through administrative interface 36. For example, administrator 34 may use administrative interface 36 to configure the expiration times and maximum number of usages for various types of temporary tokens associated with certain ones of resources 12.

Figure 3:
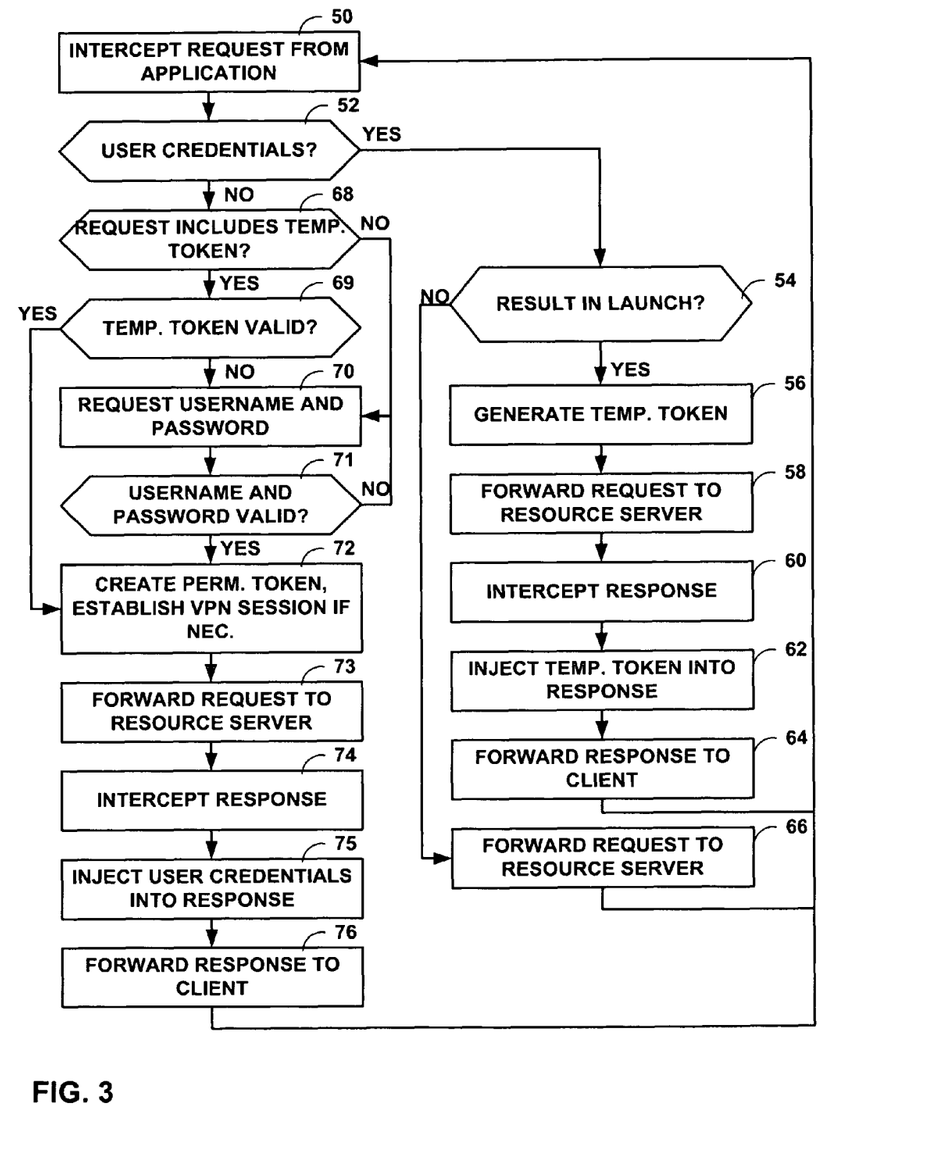
FIG. 3 is a flowchart illustrating exemplary operation of the VPN gateway in accordance with an embodiment of this invention.

FIG. 3 is a flowchart illustrating exemplary operation of VPN gateway 18 (FIG. 1) in accordance with an embodiment of this invention. Initially, VPN gateway 18 intercepts a resource request from an application executing on client device 4 (50). In this case, the application may be web browser 6 or any one of applications 8. Upon receiving the resource request, SSL VPN manager 38 in VPN gateway 18 determines whether the resource request includes valid user credentials (52).

If the resource request includes valid user credentials ("YES" of 52), SSL VPN manager 38 determines whether the resource request will result in launch of an external application, i.e., that the request specifies a resource associated with a different application other than the requesting application (54). If the resource request will not result in a launch of a new application ("NO" of 54), SSL VPN manager 38 forwards the resource request to resource server 14 (66). On the other hand, if the resource request will result in a launch (i.e., the request is for a resource associated with an application other than the application that requested the resource), SSL VPN manager 38 forwards the resource request to token creation module 44. Token creation module 44 then generates a temporary token having temporary credentials and a limited usage (56). SSL VPN manager 38 then forwards the resource request to resource server 14 (58). Subsequently, SSL VPN manager 38 transparently intercepts the response from resource server 14 (60). SSL VPN manager 38 then injects the temporary token generated by token creation module 44 into the response (62). SSL VPN manager 38 then forwards the response to client device 4 (64). After forwarding the resource request to client device 4, VPN gateway 18 waits to intercept another resource request (50).

Alternatively, SSL VPN manager 38 may invoke token creation module 44 upon intercepting the response and issue the temporary token at that time. This embodiment may allow SSL VPN manager 38 to utilize information from the intercepted response as well as information from the intercepted request in determining whether the access will result in a launch of an external application on the client device.

If the resource request does not include a user credentials ("NO" of 52), SSL VPN manager 38 determines whether the intercepted request includes a temporary token (68). If the request does not include a temporary token ("NO" of 68), SSL VPN manager 38 requests that user 17 supply a username and password for the requesting application (70). After requesting the username and password, SSL VPN manager 38 determines whether the username and password supplied by user 17 are valid (71). If the username and password supplied by user 17 are not valid ("NO" of 71), SSL VPN manager 38 requests the username and password from user 17 again (70).

On the other hand, if the intercepted request includes a temporary token ("YES" of 68), SSL VPN manager 38 forwards the temporary token to token verification module 40. Token verification module 40 then performs a verification process to determine whether the temporary token is valid (69). If the temporary token is not valid ("NO" of 69), token verification module 40 alerts SSL VPN manager 38 to this fact. Subsequently, SSL VPN manager 38 requests that user 17 supply a username and password from the application that requested the resource (70). After requesting the username and password, SSL VPN manager 38 determines whether the username and password supplied by user 17 are valid (71). If the username and password supplied by user 17 are not valid ("NO" of 71), SSL VPN manager 38 requests the username and password from user 17 again (71).

If the username and password supplied by user 17 are valid ("YES" of 68) or token verification module 40 determines that the temporary token is valid ("YES" of 69), SSL VPN manager 38 creates an application-specific cookie, i.e., a session cookie that cannot be accessed by other applications, and stores the actual credentials of user 4 within the cookie (72). If validation was based on use of a temporary cookie, verification module 40 updates token database 42.

After creating the session cookie, SSL VPN manager 38 forwards the request to resource server 14 (73). SSL VPN manager 38 then intercepts the response of resource server 14 corresponding to the resource request (74). When SSL VPN manager 38 intercepts the response, SSL VPN manager 38 injects the session cookie into the response (75). After injecting the session cookie into the response, SSL VPN manager 38 forwards the response to client device 4, thereby replacing the temporary token and providing the newly launched application with the actual user credentials without relying on an insecure persistent cookie (76).

Figure 4:
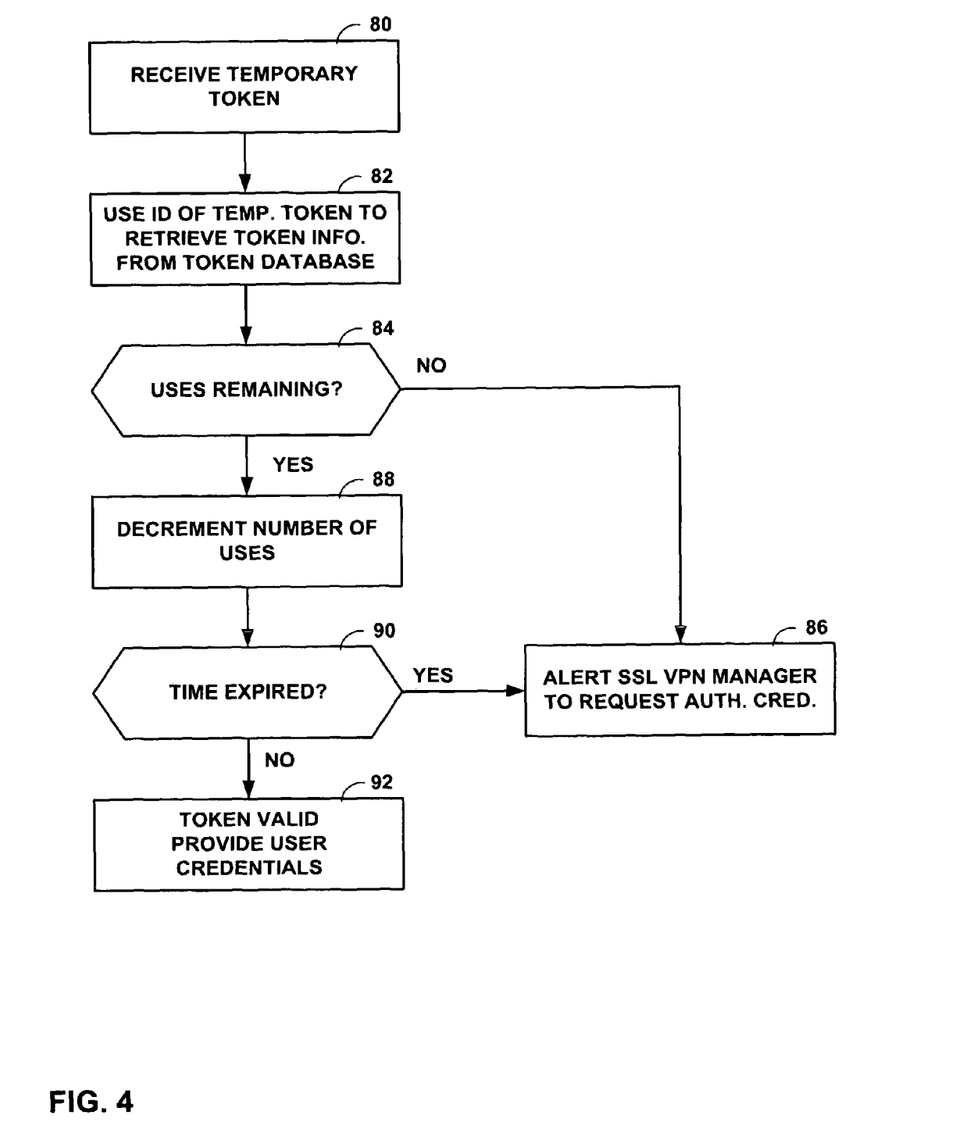
FIG. 4 is a flowchart illustrating an exemplary operation of a token verification module in the VPN gateway in accordance with the principles of this invention.

FIG. 4 is a flowchart illustrating an exemplary operation of token verification module 40 in VPN gateway 18 in accordance with the principles of this invention. Initially, token verification module 40 receives a resource request that includes a temporary token from SSL VPN manager 38 (80). Token verification module 40 then uses a token identifier in the temporary token to retrieve token information from token database (82).

After retrieving the token information for the temporary token, token verification module 40 examines the token information to determine whether there are any uses remaining for the temporary token (84). If there are no uses remaining for the temporary token ("NO" of 84), token verification module 40 alerts SSL VPN manager 38 to request authentication credentials the application that sent the resource request (86). Alternatively, if there are uses remaining for the temporary token ("YES" of 84), token verification module 40 decrements the number of uses remaining for the temporary token in token database 42 (88).

After decrementing the remaining uses for the temporary token, token verification module 40 uses the token information to determine whether time has expired for the token (90). If time has expired for the token ("YES" of 90), token verification module 40 alerts SSL VPN manager 38 to request authentication credentials for the application that sent the resource request (86). On the other hand, if time has not expired for the token ("NO" of 90), token verification module 40 informs SSL VPN manager 38 that the token has been validated and directs SSL VPN manager 38 to provide user credentials to the application that sent the resource request (92).

Figure 5:
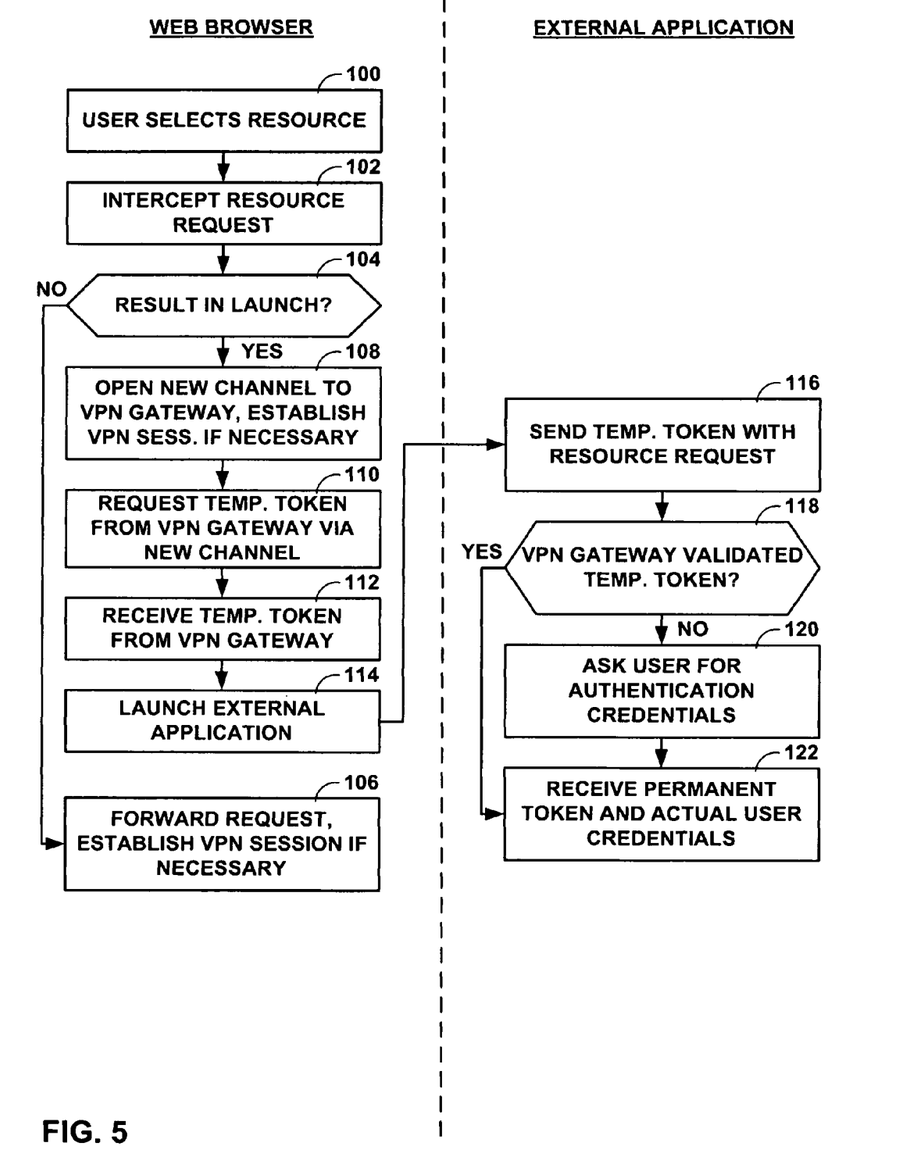
FIG. 5 is a flowchart illustrating exemplary operations of a web browser and an external software application in accordance with an alternate embodiment of this invention.

FIG. 5 is a flowchart illustrating exemplary operations of web browser 6 and an external application 8 in accordance with an alternate embodiment of this invention. Initially, user 17 selects one of resources 12 (100). For instance, user 17 may select a resource by interacting with web browser 6 and clicking on a hyperlink associated with one of resource 12. In this alternative embodiment, when user 17 generates a resource request by clinking on a link, software associated with web browser 6 (e.g., a Java script) intercepts the resource request before web browser 6 outputs the request (102).

The software then determines whether the user action will result in the launch of an external application 8, i.e., that the requested resource is associated with an application other than the web browser 6 (104). If the software determines that the action will not result in the launch of another application ("NO" of 104), web browser 6 sends the resource request to resource server 14 (106).

On the other hand, if web browser 6 determines that the request will result in the launch of an external application ("YES" of 104), web browser 6 opens a second channel of communication in the VPN session with VPN gateway 18 (108). Web browser 6 then sends a request to VPN gateway 18 for a temporary token via the new channel (110). In response, web browser 6 receives a temporary token from VPN gateway 18 (112). As described, this temporary token is valid for a limited time and for a limited number of uses. For instance, the temporary token may be valid for 30 seconds and for a single use. Upon receiving the temporary token, web browser 6 stores the temporary token in an area of client device 4 that is not specific to a given application, e.g., such as a persistent cookie that can be shared between applications 8. Web browser 6 then launches the external application associated with the remote resource (114).

After web browser 6 launches the external application, the external application sends the temporary token with a request for the resource (116). At this time, VPN gateway 18 may validate the temporary token sent with the resource request (118). If VPN gateway 18 does not successfully validate the temporary token ("NO" of 118), VPN gateway 18 asks user 17 to supply authentication credentials for the external application (120). If VPN gateway 18 successfully validates the temporary token or the username and password, the external application receives the requested resource as well as a session cookie having the user's actual credentials (122).

Figure 6:
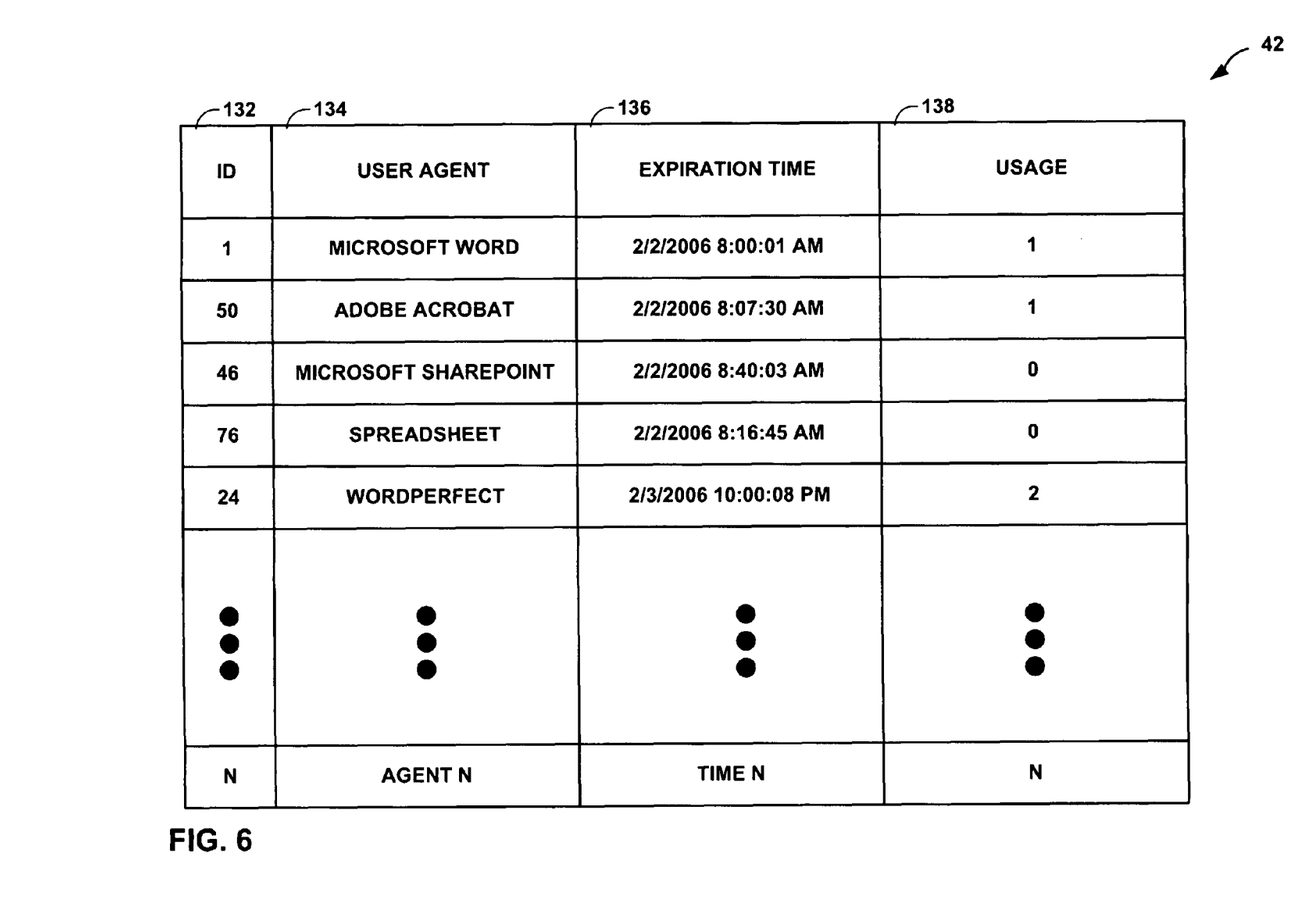
FIG. 6 illustrates an exemplary embodiment of a token database within the VPN gateway.

FIG. 6 is a table illustrating an exemplary embodiment of token database 42 within VPN gateway 18 (FIG. 2). In this exemplary embodiment, entries in token database 42 contain an identifier column 132, a user agent column 134, an expiration time column 136, and a usage column 138.

When token verification module 40 receives a resource request containing a temporary token from SSL VPN manager 38, token verification module 40 extracts an identifier from the temporary token. Token verification module 40 then queries token database 42 with the extracted identifier. If token database 42 contains an entry that has an identifier that matches the extracted identifier, token database 42 returns that entry to token verification module 40. For example, if the extracted identifier is "50", token database 42 returns the entry in token database 42 that has "50" in identifier column 132.

After receiving an entry from token database 42, token verification module 40 may check whether the "user-agent" field of the intercepted request or response matches the "user-agent" field of the entry. Continuing the above example, token verification module 40 may check whether the "user-agent" field of the resource request is "Adobe Acrobat". If the user-agent fields do not match, token verification module 40 may declare the temporary token invalid.

Next, token verification module 40 compares the current time to the expiration time of the entry. If the current time is not later than the expiration time of the entry, token verification module 40 may declare the temporary token invalid. After checking the expiration time, token verification module examines the usage field of the entry. If the usage field of the entry is less than or equal to zero, token verification module 40 may declare the temporary token invalid.

Figure 7:
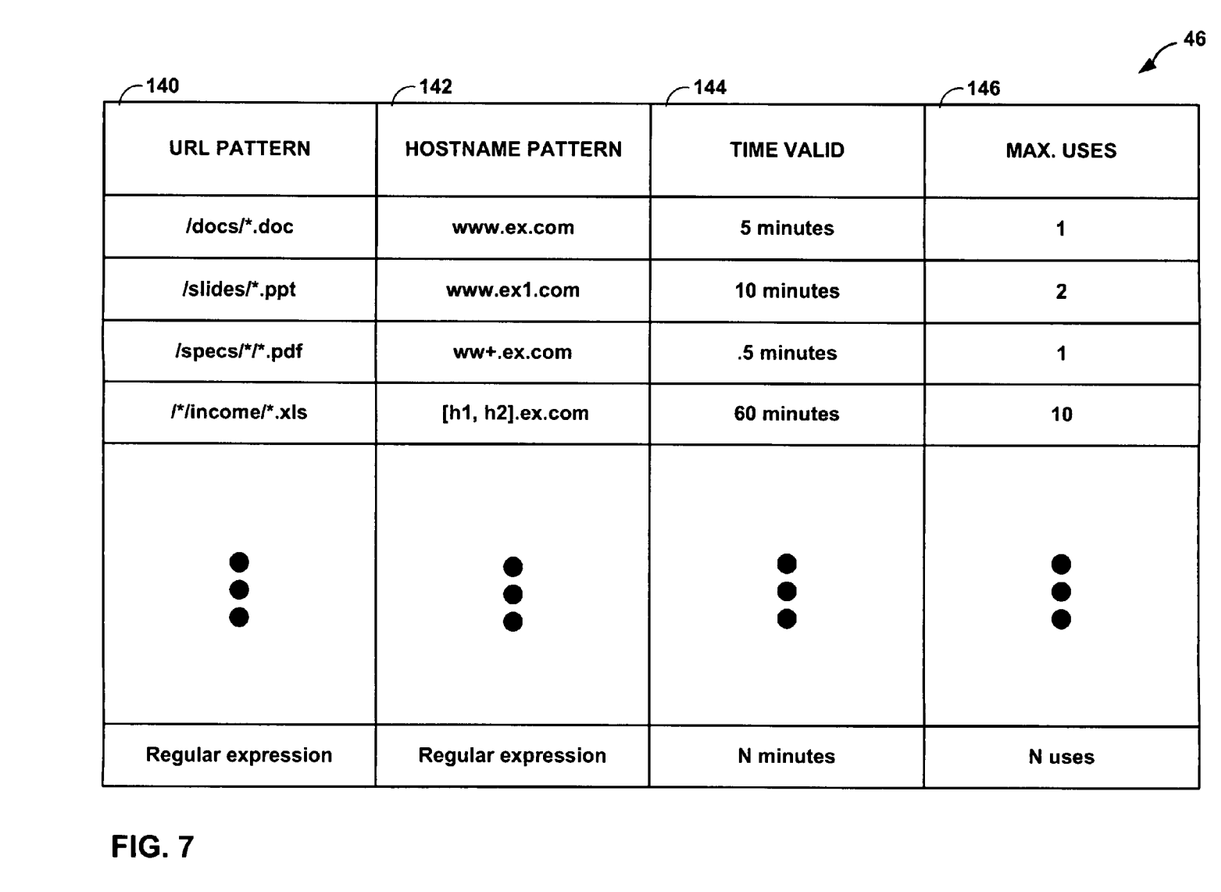
FIG. 7 illustrates an exemplary embodiment of a policy database within the VPN gateway.

FIG. 7 is a table illustrating an exemplary embodiment of policy database 46 within VPN gateway 18 (FIG. 2). In this exemplary embodiment, entries of policy database 46 have a URL pattern column 140, a hostname pattern column 142, a time valid column 144, and a maximum uses column 146. URL pattern column 140 and hostname pattern column 142 contain regular expressions. As is well known in the art, a regular expression is satisfied when a character string fulfills the pattern described by the regular expression.

When token creation module 44 receives a resource request from SSL VPN manager 38, token creation module 44 extracts the URL and hostname portions of the resource request. For example, the URL portion of the resource request may be "/docs/myDoc.doc" and the hostname portion may be "www.ex.com". The combination of the URL portion and the hostname portion of the resource request identifies which resource is requested.

After extracting the URL and hostname portions of the resource request, token creation module 44 compares the URL portion of the resource request to the regular expression in each of the URL patterns in URL pattern column 140. If the URL portion of the resource request satisfies a URL pattern in URL pattern column 140, token creation module 144 compares the hostname portion of the resource request to the regular expression in the hostname pattern in the same entry of policy database 46 as the satisfied URL pattern.

If the URL portion and the hostname portion of the resource request satisfy the URL pattern and the hostname pattern of an entry in policy database 46, token creation module 44 creates a new temporary token. In addition, token creation module 44 creates an entry in token database 42. The entry in token database 42 is valid for the time of the entry listed in time valid column 144 and for the number of uses of the entry listed in maximum uses column 146.

Various embodiments of the invention have been described. For instance, FIG. 1 described a system in which a web browser launched external applications. Nevertheless, many modifications may be made without departing from the principles of this invention. For instance, any number of applications may launch external applications. For example, a word processor with a actual user credentials may launch a spreadsheet application. Moreover, VPN gateway 18 may be integrated within resource server 14. These and other embodiments are within the scope of the following claims.

The invention claimed is:

1. A method comprising:
   intercepting a first request for a resource stored on a server, wherein the first request originates from a first software application executing on a client device, wherein the first software application comprises a web browser, wherein the web browser is authenticated with an intermediate device by actual authentication credentials associated with a user;
   issuing a temporary token from the intermediate device to the client device when the requested resource will result in the first software application launching a second software application external to the web browser on the client device, wherein the intermediate device is located between the client device and the server, and wherein the temporary token is valid for a limited time and for a limited number of uses and is based in part on the actual authentication credentials;
   receiving a second request from the second software application to access the resource, wherein the second request includes the temporary token, and wherein the second request identifies a type of the second software application;

in response to determining, by the intermediate device, that the temporary token is valid based in part on the actual authentication credentials associated with the user, forwarding the second request to the server;

intercepting, by the intermediate device, a response from the server based in part on the second request;

injecting the actual authentication credentials into the response as an application-specific cookie, wherein the application-specific cookie is specific to the second software application and based in part on the type of the second software application; and forwarding the response including the application-specific cookie to the client device to replace the temporary token.

2. The method of claim 1,
wherein intercepting comprises intercepting the first request with the intermediate device located between the client device and the server, and
wherein issuing comprises:
determining at the intermediate device that the first request will result in the first software application launching the second software application on the client device; and
issuing the temporary token from the intermediate device to the client device.

3. The method of claim 1, wherein authenticating comprises updating a database on the intermediate device by decrementing a number of uses remaining for the temporary token when the second software application is authenticated.

4. The method of claim 1, further comprising:
intercepting with the intermediate device a response from the server;
injecting the temporary token into the response; and
forwarding the response having the temporary token from the intermediate device to the client device.

5. The method of claim 1, wherein intercepting the first request comprises intercepting the first request at the client device.

6. The method of claim 5, wherein authenticating comprises:
after intercepting the first request at the client device, determining at the client device that the first request will result in the first software application launching a second software application on the client device;
opening a new channel of communication between the client device and the intermediate device; and
sending a request for the temporary token from the client device to the intermediate device via the new channel.

7. The method of claim 1, wherein authenticating the temporary token with the intermediate device comprises:
obtaining from a database an expiration time and a number of remaining uses for the temporary token,
determining that the temporary token is valid when a current time is not later than the expiration time and the number of remaining uses is greater than zero.

8. The method of claim 1, further comprising generating the first request for the resource in response to a user clicking on a link displayed by the web browser.

9. The method of claim 1, further comprising creating the temporary token in accordance with one or more policy rules stored in a policy database.

10. The method of claim 9, wherein creating the temporary token comprises:
applying regular expressions within the policy rules to identify one of the policy rules having regular expressions that match patterns of strings within the first request; and determining the limited time and the limited number of uses for which the temporary token is valid based on the identified policy rule.

11. The method of claim 1, wherein issuing a temporary token comprises issuing a persistent cookie associated with the limited time and the limited number of uses, wherein the persistent cookie does not contain any user credentials.

12. A network device comprising a control unit having one or more processors:
a network interface to intercept a first request for a resource, wherein the first request originates from a first software application executing on a client device, wherein the first software application comprises a web browser, and wherein the web browser is authenticated by the network device using actual authentication credentials associated with a user;
a token creation module operable by the control unit to create a temporary token when the resource is associated with a second software application that will result in the first software application launching the second software application external to the web browser, wherein the temporary token is valid for a limited time and a limited number of uses and is based in part on the actual authentication credentials;
wherein the network interface receives a second request from the second software application to access the resource, wherein the second request includes the temporary token, and wherein the second request identifies a type of the second software application;
a secure socket layer (SSL) virtual private network (VPN) manager operable by the control unit to, in response to determining that the temporary token is valid based in part on the actual authentication credentials associated with the user, forward the second request to a server;
wherein the SSL VPN manager intercepts a response from the server based in part on the second request and injects the actual authentication credentials into the response as an application-specific cookie, wherein the application-specific cookie is specific to the second software application and based in part on the type of the second software application; and
wherein the network interface forwards the response including the application-specific cookie to the client device to replace the temporary token.

13. The network device of claim 12, further comprising
a database storing data defining an expiration time and a number of remaining uses for the temporary token; and
a token verification module to verify that the temporary token to access the database is valid when a current time is not later than the expiration time and when the number of remaining uses is greater than zero.

14. The network device of claim 12, further comprising
a policy database defining a set of rules, wherein each of the rules specifies regular expressions for matching patterns within the intercepted request, and wherein each of the rules specifies a corresponding valid time and number of uses,
wherein the token creation module creates the temporary token in accordance with policy rules stored in a policy database.

15. The network device of claim 12, wherein the temporary token is a persistent cookie that does not contain any user credentials.

16. A system comprising:
a client device on which a first software application and a second software application execute, the first software application issuing a first request for a resource, wherein the first software application comprises a web browser;

a resource server for providing the client device with access to the resource; and an intermediate device located between the client device and the resource server, wherein the intermediate device intercepts the first request and issues a temporary token to the client device when the requested resource is associated with the second software application that will result in the first software application launching the second software application external to the web browser, and wherein the web browser is authenticated with the intermediate device by actual authentication credentials associated with a user, wherein the temporary token is valid for a limited time and for a limited number of uses and is based in part on the actual authentication credentials, receives a second request from the second software application to access the resource, wherein the second request includes the temporary token, wherein the second request identifies a type of the second software application, in response to determining that the temporary token is valid based in part on the actual authentication credentials associated with the user, forwards the second request to the resource server, intercepts a response from the resource server based in part on the second request and injecting the actual authentication credentials into the response as an application-specific cookie, wherein the application-specific cookie is specific to the second software application and based in part on the type of the second software application, and forwards the response including the application-specific cookie to the client device to replace the temporary token.

17. The system of claim 16, wherein the intermediate device issues the temporary token as a persistent cookie that does not contain any user credentials.

18. A non-transitory computer-readable medium comprising instructions for causing a programmable processor of an intermediate network device to:

Intercept, with an intermediate network device located between a client device and a server, a first request from a first software application executing on the client device, wherein the first software application comprises a web browser, wherein the web browser is authenticated by the intermediate network device using actual authentication credentials associated with a user;

issue a temporary token to the client device when the first request identifies a resource associated with a second software application that will result in the first software application launching a second software application external to the web browser, wherein the temporary token is valid for a limited time and for a limited number of uses and is based in part on the actual authentication credentials;

receives a second request from the second software application to access the resource, wherein the second request includes the temporary token, wherein the second request identifies a type of the second software application;

in response to determining that the temporary token is valid based in part on the actual authentication credentials associated with the user, forwarding the second request to the server;

intercept a response from the server based in part on the second request and injecting the actual authentication credentials into the response as an application-specific cookie, wherein the application-specific cookie is specific to the second software application and based in part on the type of the second software application; and forward the response including the application-specific cookie to the client device to replace the temporary token.

* * * * *